United States Patent [19]
Baik

[11] Patent Number: 5,663,774
[45] Date of Patent: Sep. 2, 1997

[54] THREE TUBE BEAM PROJECTION SYSTEM AND METHOD

[75] Inventor: Jong Soo Baik, Seoul, Rep. of Korea

[73] Assignee: Goldstar Co., Ltd., Seoul, Rep. of Korea

[21] Appl. No.: 357,170

[22] Filed: Dec. 13, 1994

[30] Foreign Application Priority Data

Dec. 13, 1993 [KR] Rep. of Korea ............... 27534/1993

[51] Int. Cl.$^6$ .................. H04N 5/74; H04N 9/31
[52] U.S. Cl. ............ 348/744; 348/779; 348/825; 348/836
[58] Field of Search ............... 348/744, 745, 348/776, 778–779, 781–782, 825, 836; 358/60, 231; 313/2.1; H04N 5/74, 9/31

[56] References Cited

U.S. PATENT DOCUMENTS

| | | | |
|---|---|---|---|
| 4,194,216 | 3/1980 | Ohmori | 348/781 |
| 4,473,840 | 9/1984 | Miyatake | 348/745 |
| 5,276,524 | 1/1994 | Inoue et al. | 348/778 |

*Primary Examiner*—Sherrie Hsia

[57] ABSTRACT

A projection system suitable for reducing the convergence angles for red, green and blue color beams is disclosed. The projection system includes first and second beam projection tubes arranged in an in-line type arrangement in the center of the interior of a support part of the system, and a third beam projection tube placed beside the first and second beam projection tubes and inclined relative to the first and second projection tubes at predetermined inclination angles. A dichroic mirror is placed on an optical axis of the third projection tube in front of the third projection tube. The dichroic mirror transmits the beams projected by the first and second projection tubes but reflects the beam projected by the third projection tube. The third beam projection tube may be placed in back of the first and second beam projection tubes.

18 Claims, 10 Drawing Sheets

THREE TUBE BEAM PROJECTION SYSTEM AND METHOD

BACKGROUND OF THE INVENTION

1. Field of the Invention

The present invention relates in general to a projection system and, more particularly, to a structural improvement in such a projection system for reducing the convergence angles for red, green and blue color beams using a dichroic mirror, thus to increase the horizontal and vertical visible angles, reduce color shift of a color picture displayed on a screen, improve uniformity of the color picture, reduce convergence compensating amount, as well as circuit compensating amount or keystone compensating amount and to improve luminance due to reduction of the keystone compensating amount.

2. Description of the Background Art

With reference to FIGS. 1 to 4, there is shown a typical projection system. As shown in these drawings, the typical projection system 10 has a support part 10a and a screen part 10b in its bottom section and in its top section respectively.

In the interior of the support part 10a, three beam projection tubes, that is, a red beam projection tube 11 having a first projection lens 11' in its front section, a green beam projection tube 12 having a second projection lens 12' in its front section and a blue beam projection tube 13 having a third projection lens 13' in its front section, are arranged in a horizontal line in the center of the interior of the support part 10a, thus to form an in-line arrangement of the beam projection tubes. In the above projection system, the red beam projection tube 11, the green beam projection tube 12 and the blue beam projection tube 13 have a first side optical axis 11", a center optical axis 12" and a second side optical axis 13", respectively.

Placed in the screen part 10b above the three beam tubes 11, 12 and 13 is a reflection mirror 14 that reflects the beams of the three optical axes 11", 12" and 13". A screen 15 is placed in front of the reflection mirror 14, so that the screen 15 displays thereon the three beams reflected by the reflection mirror 14.

The first and second side optical axes 11" and 13" are inclined at an angle α of inclination relative to the center optical axis 12" as shown in FIG. 3. The inclination angle α is so-called a convergence angle of the projection system 10. In order to compensate for the deviation of the three beams caused by the convergence angle α, each of first and second projection tubes 11 and 13 of the projection system 10 is provided with Scheimflug angle α' as shown in FIG. 4.

As the red beam tube 11, the green beam tube 12 and the blue beam tube 13 are arranged in the in-line type as described above, the first and second side optical axes 11" and 13" of the red and blue beam projection tubes 11 and 13 should be deflected toward the center optical axis 12" of the green beam projection tube 12 at a predetermined angle. However, the deflection of the first and second side optical axes 11" and 13" increases compensating amount, thus causing a difficulty in compensation. Even when the color picture is fortunately accurately focused on the screen 15 as a result of compensation, there may be another problem of color shift in the color picture displayed on the screen 15. A further problem of the typical projection system is resided in that the system not only narrows the vertical and horizontal visible angles but also causes nonuniform color of the picture displayed on the screen 15.

In addition, when using a short focus lens in order to reduce the length of the beam path, the total conjugation length (TCL) is shortened, thus increasing the compensating amount due to the intervals between the three beam projection tubes 11, 12 and 13, increasing color shift of the picture displayed on the screen 15, and increasing convergence compensating amount as well as keystone compensating amount. Both increases in the convergence compensating amount and in the keystone compensating amount cause a circuit to be overloaded. Particularly, the increase in the convergence compensating amount causes deterioration of both luminance and resolution of the picture displayed on the screen.

SUMMARY OF THE INVENTION

It is, therefore, an object of the present invention to provide a projection system in which the above problems can be overcome and which reduces the convergence angles for red, green and blue color beams using a dichroic mirror, thus to increase the horizontal and vertical visible angles, reduce color shift of a color picture displayed on a screen, improve uniformity of the color picture, reduce convergence compensating amount as well as keystone compensating amount of a circuit, and to improve luminance of the color picture due to reduction of the keystone compensating amount.

In order to accomplish the above object, a projection system in accordance with a preferred embodiment of the present invention comprises: a support part and a screen part provided in a bottom section and in a top section of the projection system; first and second beam projection tubes arranged in the in-line type in the center of the interior of the support part; a third beam projection tube placed beside the first and second beam projection tubes, the third projection tube being arranged in the in-line type relative to the first and second projection tubes but inclined relative to the first and second projection tubes at predetermined inclination angles; and a dichroic mirror placed on an optical axis of the third projection tube in front of the third projection tube, the dichroic mirror transmitting the beams projected by the first and second projection tubes but reflecting the beam projected by the third projection tube.

In accordance with another embodiment of the invention, the third beam projection tube is placed in back of the first and second beam projection tubes and inclined relative to the first and second projection tubes at predetermined inclination angles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
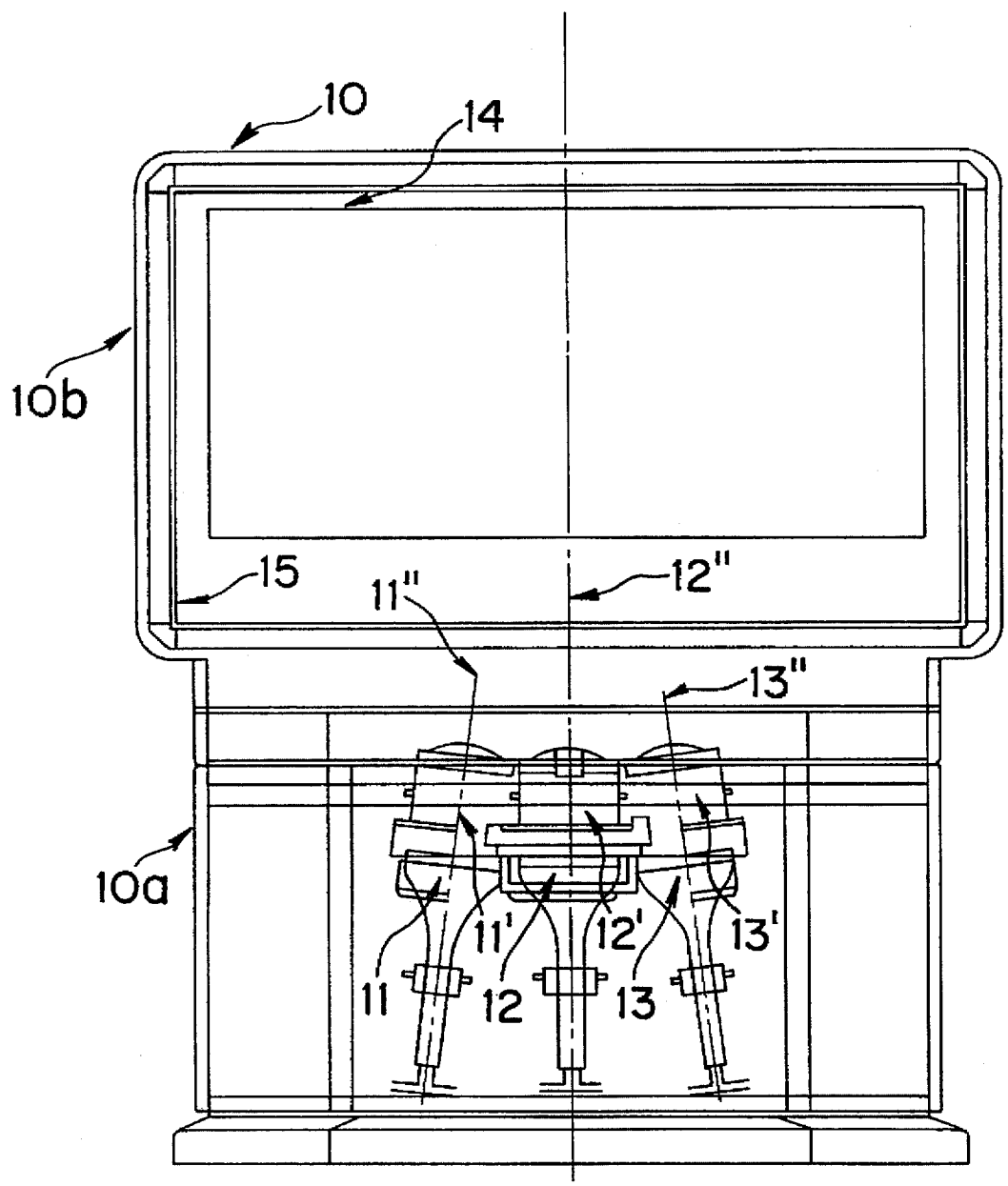
FIG. 1 is a front view of a typical projection system.
Figure 2:
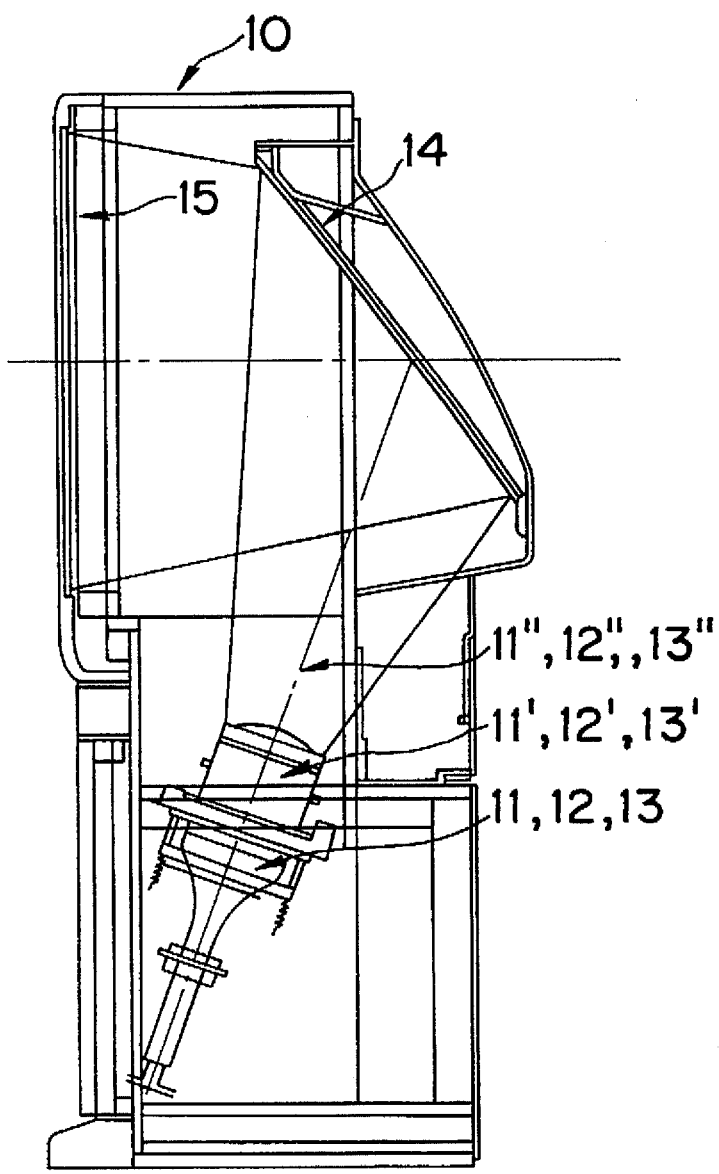
FIG. 2 is a side view of the projection system of FIG. 1.
Figure 3:
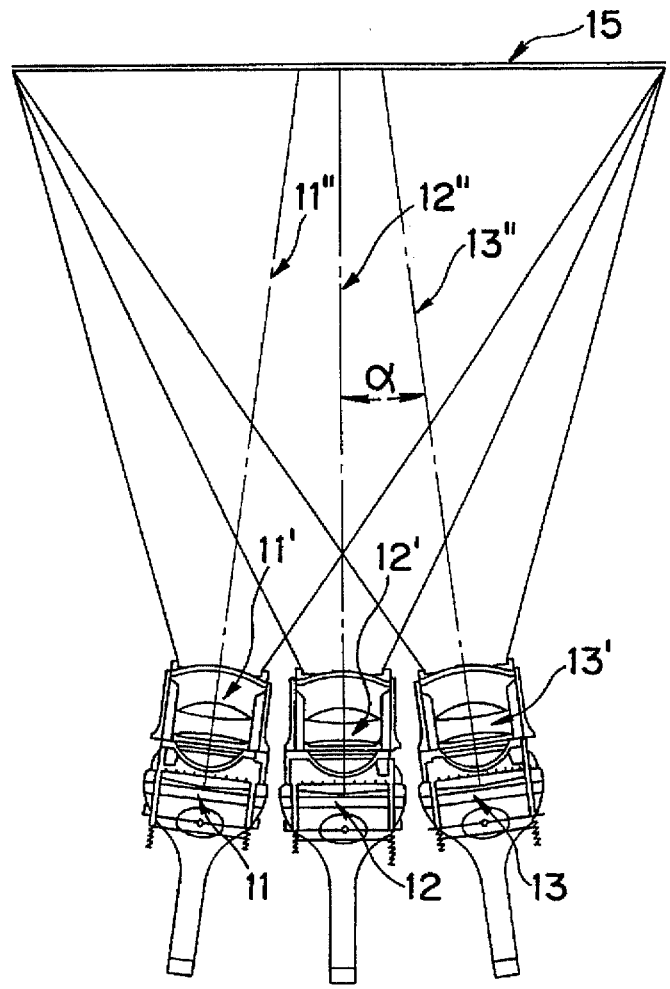
FIG. 3 is a front view of the projection system of FIG. 1, showing optical paths of three projection tubes of the typical projection system.
Figure 4:
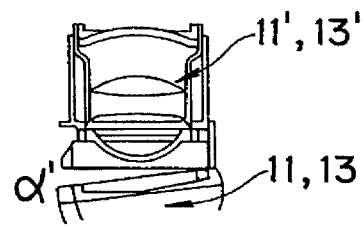
FIG. 4 is a view of a beam projection tube of the projection system of FIG. 1, showing Scheimflug angle of the typical projection system.
Figure 5:
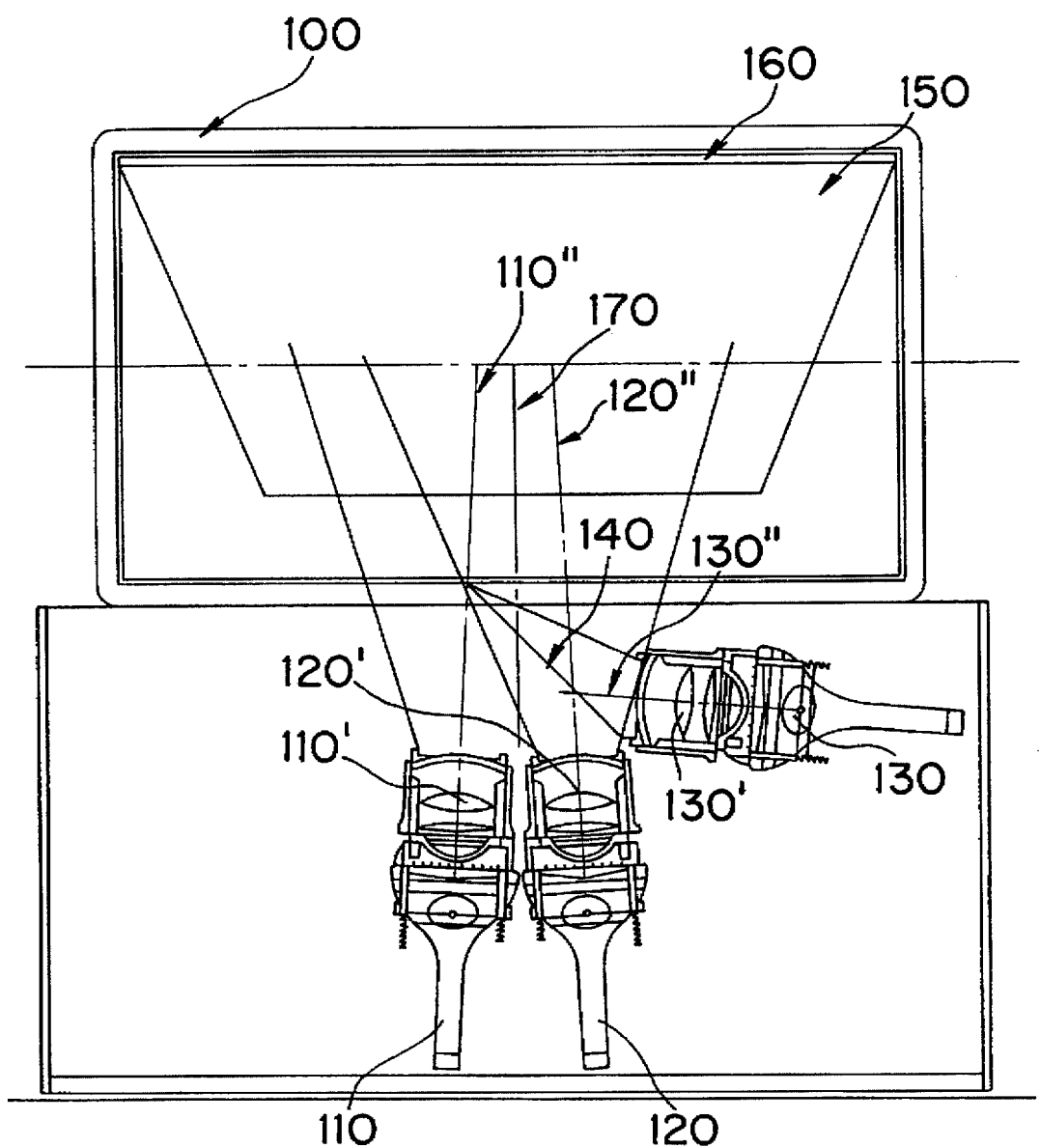
FIG. 5 is a front view of a projection system in accordance with a first embodiment of the present invention.
Figure 6:
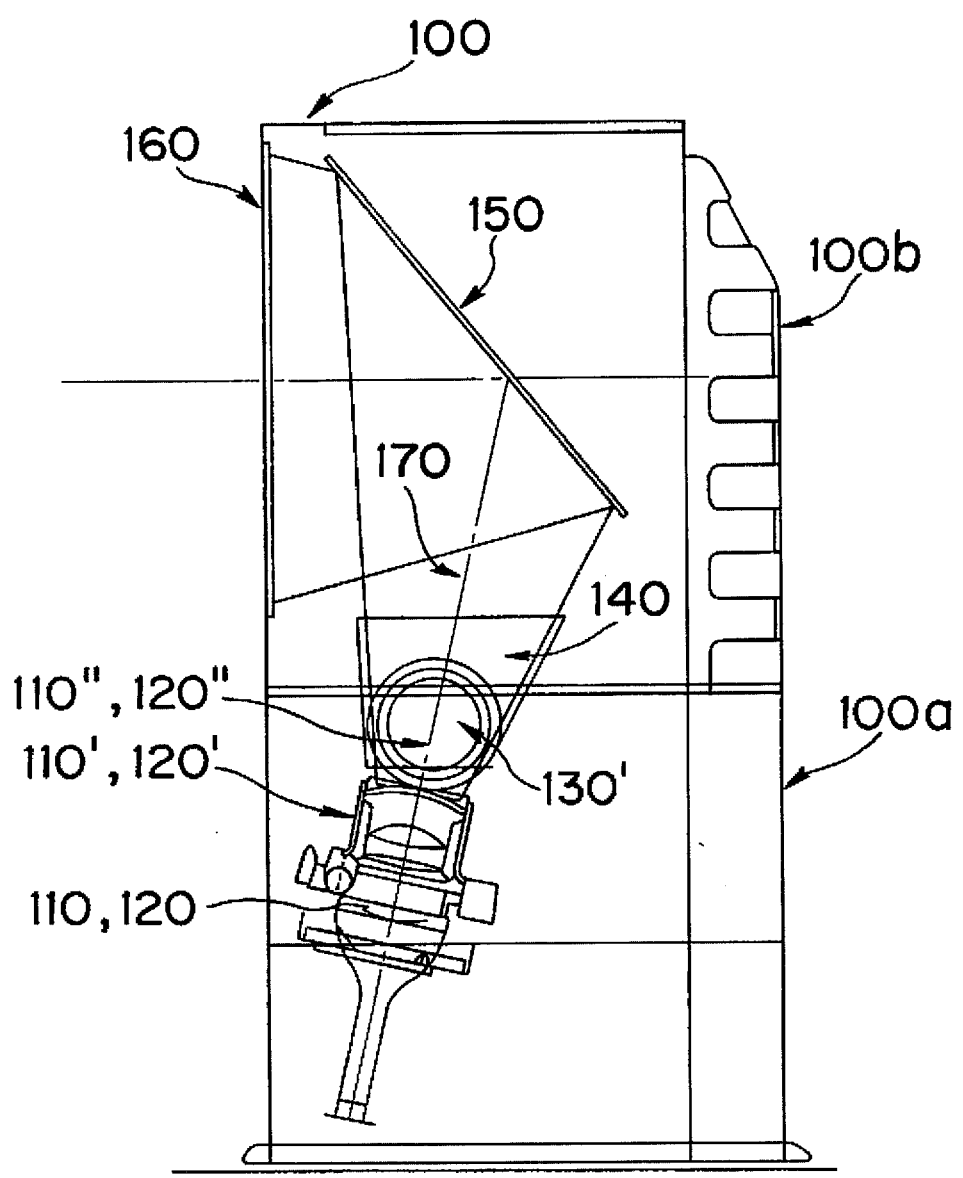
FIG. 6 is a side view of the projection system of FIG. 5.

With reference to FIGS. 5 to 8, there is shown a projection system in accordance with a first embodiment of the present invention. As shown in these drawings, the projection system 100 has a support part 100a and a screen part 100b in its bottom section and in its top section, respectively.

In the interior of the support part 100a, a first beam projection tube 110 having a first projection lens 110' in its front section and a second beam projection tube 120 having a second projection lens 120' in its front section are arranged in the in-line type arrangement in the center of the interior of the support part 100a, thus to form an in-line arrangement of the beam projection tubes 110 and 120. The first and second beam projection tubes 110 and 120 have their center optical axes, that is, first and second center optical axes 110" and 120", which center a third center optical axis 170. Adjacent to the first and second projection tubes 110 and 120, a third beam projection tube 130 having a third projection lens 130' in its front section is placed such that the third projection tube 130 is arranged in the in-line type arrangement relative to the first and second projection tubes 110 and 120, but inclined relative to the first and second projection tubes 110 and 120 at predetermined inclination angles. The third projection tube 130 having the third projection lens 130' has a side optical axis 130". Placed on the side optical axis 130" in front of the third projection lens 130 is a dichroic mirror 140 which is inclined relative to the side optical axis 130" at a predetermined inclination angle. The dichroic mirror 140 transmits the beams projected by the first and second projection tubes 110 and 120 but reflects the beam projected by the third projection tube 130.

The optical axis 130" of the beam projected by the third projection tube 130 and reflected by the dichroic mirror 140, coincides with the third center optical axis 170 at a predetermined position.

The beams of the first to third center optical axes 110", 120" and 170, after being transmitted through the dichroic mirror 140, are reflected by a reflection mirror 150 and in turn displayed on a screen 160 of the screen part 100b.

Figure 7:
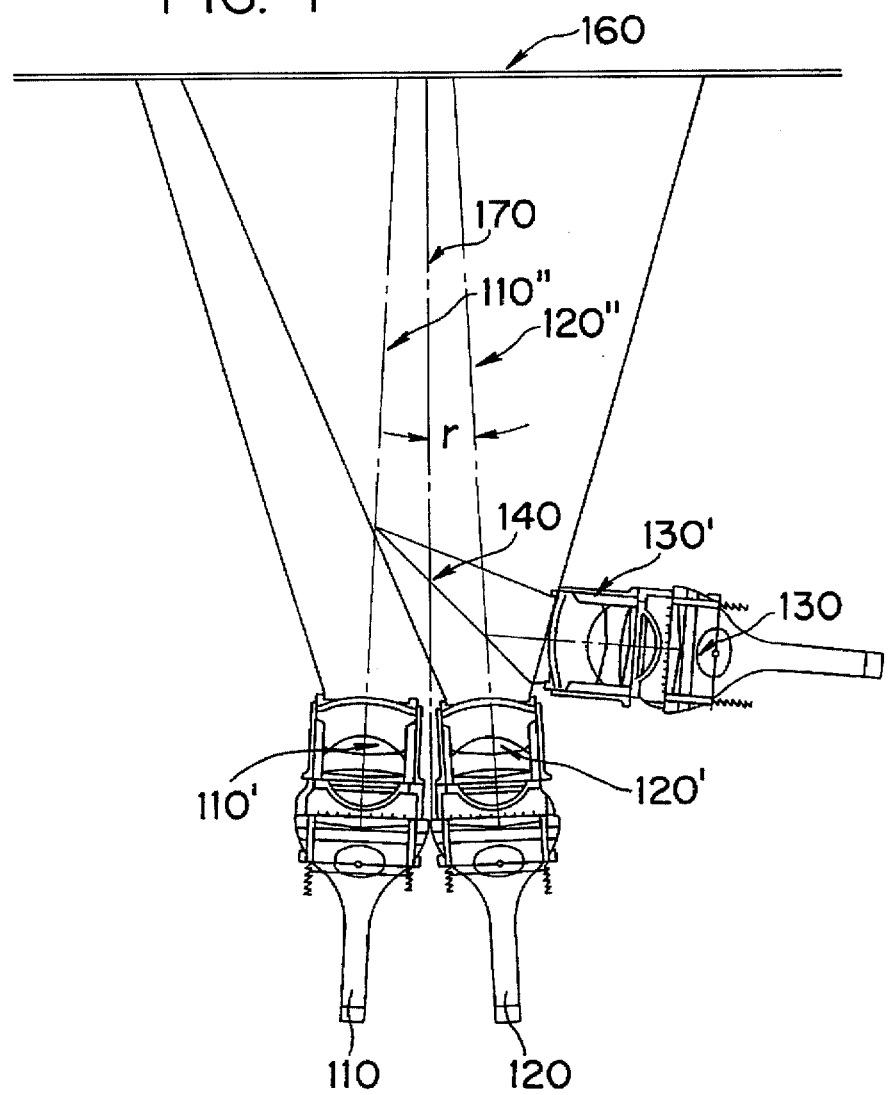
FIG 7 is a front view of the projection system of FIG. 5, showing optical paths of projection tubes of the projection system.
Figure 8:
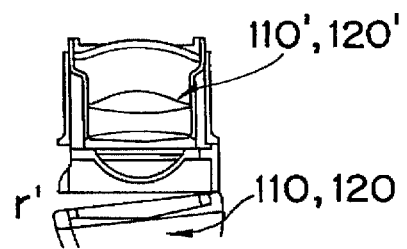
FIG. 8 is a view of a beam projection tube of the projection system of FIG. 5, showing Scheimflug angle of the projection system.
Figure 9:
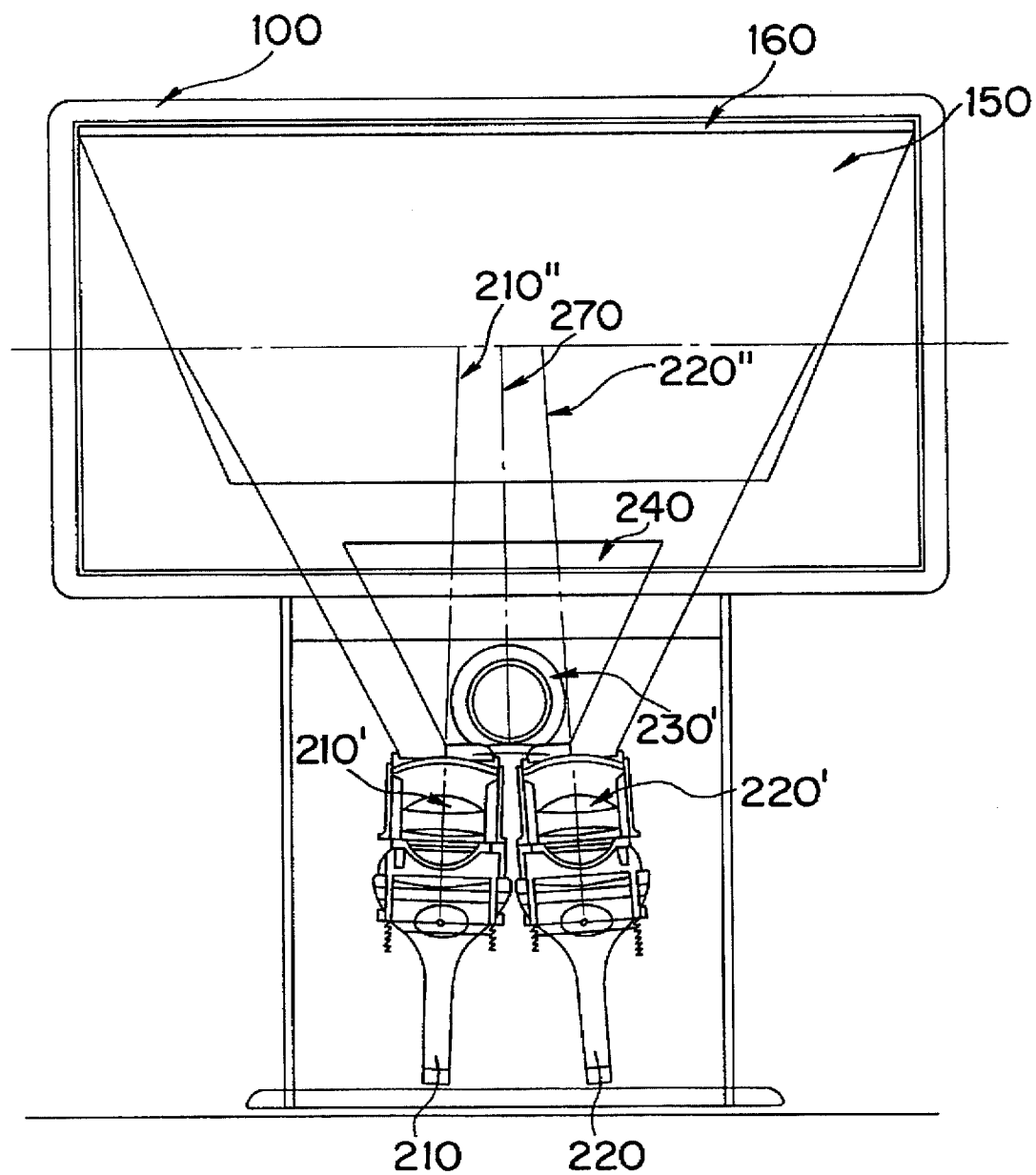
FIG. 9 is a front view of a projection system in accordance with a second embodiment of the present invention.
Figure 10:
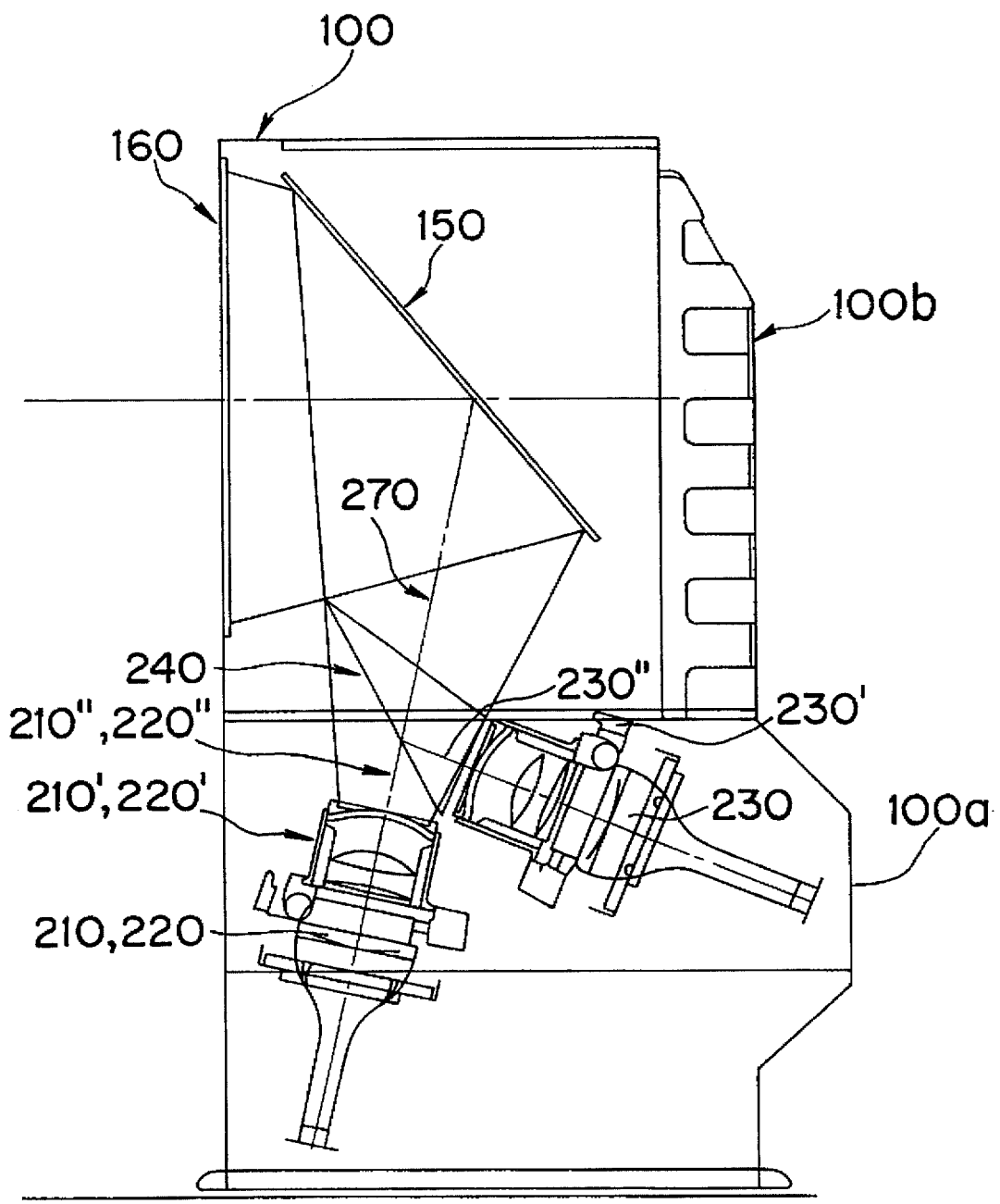
FIG. 10 is a side view of the projection system of FIG. 9.

In order to converge the first and second center optical axes 110" and 120" into the third center optical axis 170, the first and second beam projection tubes 110 and 120 are inclined relative to the third center optical axis 170 at a convergence angle γ as shown in FIG. 7. In order to compensate for the deviation of the three beams caused by the convergence angle γ, each of the first and second projection tubes 110 and 120 of the projection system 100 is also provided with Scheimflug angle γ' as shown in FIG. 8.

In the projection system of the first embodiment, the dichroic mirror 140 is specifically constructed in such a manner that the mirror 140 is coated with a filter so as to reflects the beam projected by the third projection tube 130 but transmit the beams projected by the first and second projection tubes 110 and 120.

When letting the third projection tube 130 be a blue beam projection tube, the dichroic mirror 140 will be coated with a short wavelength beam transmissive filter. However, when letting the third projection tube 130 be a green beam projection tube, the dichroic mirror 140 will be coated with a specified wavelength beam transmissive filter.

Turning to FIGS. 9 to 13, there is shown a projection system in accordance with a second embodiment of the present invention. In the second embodiment, the general shape of the projection system remains the same as described for the projection system of the first embodiment, but the position of the third projection tube as well as the position of the dichroic mirror is alternated. That is, the third projection tube 230 of the projection system of the second embodiment is placed in a predetermined position in back of first and second projection tubes 210 and 220. Otherwise stated, the third projection tube 230 is placed in the predetermined position in the rear section of the projection system 100.

In the projection system of the second embodiment, the dichroic mirror 240 is placed on a side optical axis 230" of the third projection tube 230 in front of the third projection lens 230. The dichroic mirror 240 is inclined relative to the optical axis 230" at a predetermined inclination angle. The dichroic mirror 240 transmits the beams projected by first and second projection lenses 210' and 220' of the first and second projection tubes 210 and 220 but reflects the beam projected by a third projection lens 230' of the third projection tube 230 as described for the first embodiment.

The optical axis 230" of the beam projected by the third projection lens 230' and reflected by the dichroic mirror 240, coincides with a third center optical axis 270 formed by first and second center optical axes 210" and 220" of the first and second projection tubes 210 and 220.

The beams of the first to third center optical axes 210", 220" and 270, after being transmitted through the dichroic mirror 240, are reflected by the reflection mirror 150 and in turn displayed on the screen 160 of the screen part 100b.

Figure 11:
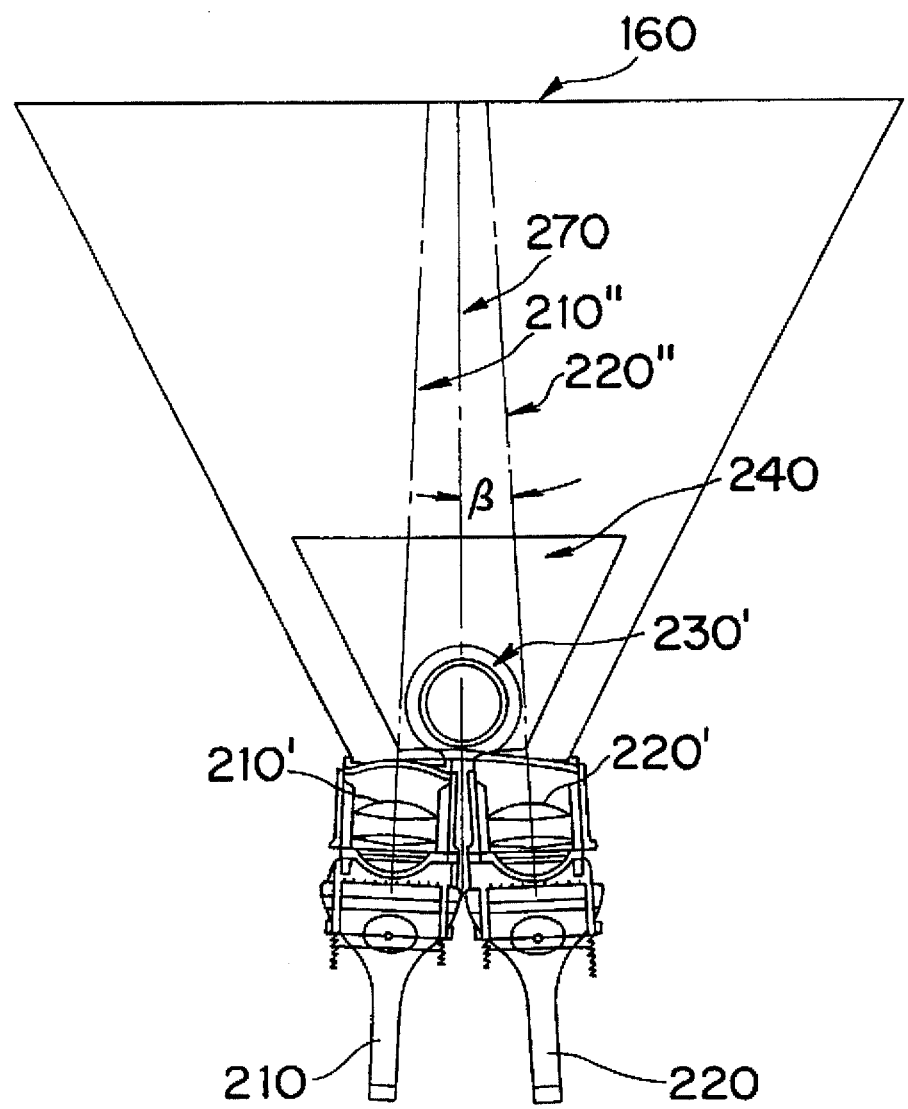
FIG. 11 is a front view of the projection system of FIG. 9, showing optical paths of projection tubes of the projection system.
Figure 12:
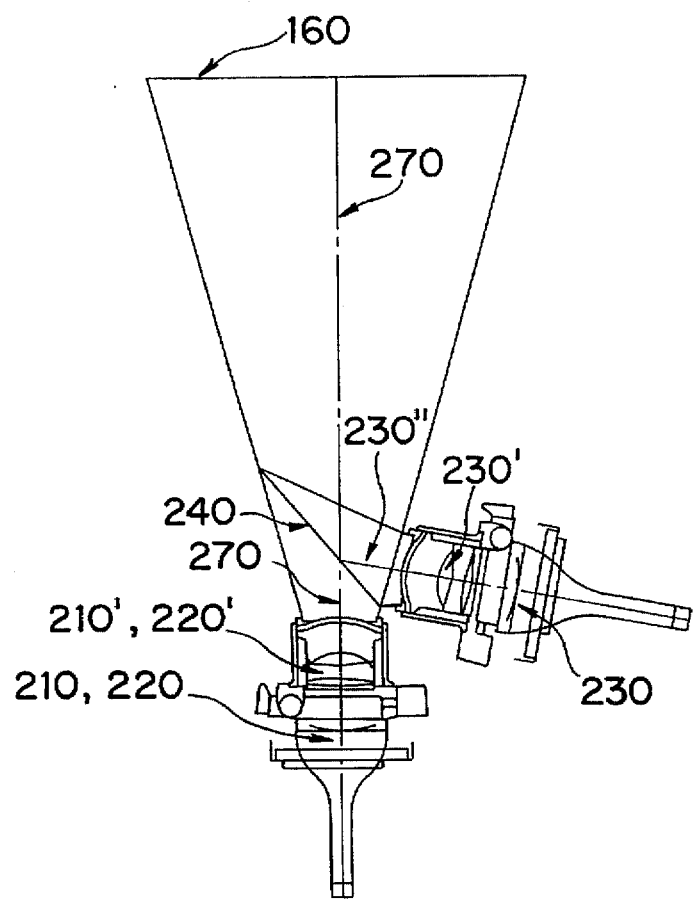
FIG. 12 is a side view of the projection system of FIG. 9, showing the optical paths of the projection tubes of the projection system.
Figure 13:
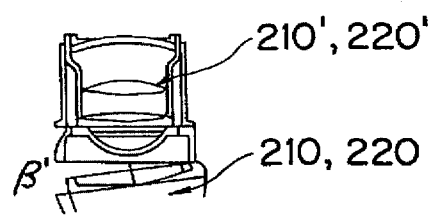
FIG. 13 is a view of a beam projection tube of the projection system of FIG. 9, showing Scheimflug angle of the projection system.

In order to converge the first and second center optical axes 210" and 220" into the third center optical axis 270, the first and second beam projection tubes 210 and 220 are inclined relative to the third center optical axis 270 at a convergence angle β as shown in FIG. 11. In order to compensate for the deviation of the three beams caused by the convergence angle β, each of the first and second projection tubes 210 and 220 of the second embodiment is also provided with Scheimflug angle β' as shown in FIG. 13.

The projection system of the second embodiment yields the same operational effect as described for the first embodiment. Therefore, a further explanation for the operational effect of the second embodiment will not be necessary.

As described above, the projection system of the present invention reduces optical compensating amount as well as circuit compensating amount during a beam projection of a three tube/three lens projection system. Therefore, this projection system results in improvement of picture quality, reduction of color shift of the picture displayed on the screen and uniformity of color of the picture. The projection system also increases vertical and horizontal visible angles, enlarging the visible region of the screen. Additionally, reduction of the circuit compensating amount results in precise compensation for convergence, and reduction of keystone compensating amount results in improvement of luminance of the picture.

The projection system of the invention may be preferably adapted to a forward projection system with television using three tubes and three lenses, adapted to a backward projection system with television using three tubes and three lenses, and a multi-projection system with television using three tubes and three lenses.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A projection system having a support part in a bottom section of the system and a screen part in a top section of the system, the system comprising:

first and second beam projection tubes arranged in-line in a center of an interior of the support part, wherein said first beam projection tube is beside said second beam projection tube;

a third beam projection tube placed beside said first and second beam projection tubes, said third beam projection tube being arranged substantially coplanar with the first and second beam projection tubes and being inclined relative to the first and second beam projection tubes at predetermined inclination angles; and partially reflecting means, placed on an optical axis of said third beam projection tube in front of the third beam projection tube, for transmitting beams projected by the first and second beam projection tubes and reflecting a beam projected by the third beam projection tube.

2. The projection system according to claim 1, wherein optical axes of the first and second beam projection tubes coincide with the optical axis of the third beam projection tube at a predetermined position.

3. A projection system having a support part in a bottom section of the system and a screen part in a top section of the system, the system comprising:

first and second beam projection tubes arranged in-line in a center of an interior of the support part;

a third beam projection tube placed in back of and between said first and second beam projection tubes, said third beam projection tube being inclined relative to the first and second beam projection tubes at predetermined inclination angles; and partially reflecting means, placed on an optical axis of said third beam projection tube in front of the third beam projection tube, for transmitting beams projected by the first and second beam projection tubes and reflecting a beam projected by the third beam projection tube.

4. The projection system according to claim 3, wherein optical axes of the first and second beam projection tubes coincide with the optical axis of the third beam projection tube at a predetermined position.

5. A projection system according to claim 1, wherein each of said first and second beam projection tubes is provided with Scheimflug angle.

6. A projection system according to claim 1, further comprising:

a screen disposed in the screen part, and reflection means, disposed in the screen part, for reflecting onto said screen the beams transmitted through and the beam reflected by said partially reflecting means.

7. A projection system according to claim 6, wherein said reflection means includes a reflection mirror.

8. A projection system according to claim 1, wherein each of said first, second, and third beam projection tubes includes a projection lens.

9. A projection system according to claim 1, wherein said partially reflecting means includes a dichroic mirror.

10. The projection system according to claim 3, wherein each of said first and second beam projection tubes is provided with Scheimflug angle.

11. The projection system according to claim 3, further comprising:

a screen disposed in the screen part, and reflection means, disposed in the screen part, for reflecting onto said screen the beams transmitted through and the beam reflected by said partially reflecting means.

12. The projection system according to claim 11, wherein said reflection means includes a reflection mirror.

13. A projection system according to claim 3, wherein each of said first, second, and third beam projection tubes includes a projection lens.

14. A projection system according to claim 3, wherein said partially reflecting means includes a dichroic mirror.

15. A method of projecting light beams onto a screen of a projection system, comprising the steps:

providing first and second beam projection tubes beside each other and arranged in-line in an interior of a support part of the projection system;

placing a third beam projection tube beside the first and second beam projection tubes so that the third beam projection tube is substantially coplanar with the first and second beam projection tubes and inclined relative to the first and second beam projection tubes at predetermined inclination angles;

transmitting beams projected by the first and second beam projection tubes and reflecting a beam projected by the third beam projection tube; and reflecting the transmitted and reflected beams onto the screen.

16. A method according to claim 15, wherein said transmitting and reflecting steps include the step of using a dichroic mirror placed on an optical axis of the third beam projection tube in front of the third beam projection tube and using a reflection mirror.

17. A method of projecting light beams onto a screen of a projection system, comprising the steps:

providing first and second beam projection tubes arranged in-line in an interior of a support part of the projection system;

placing a third beam projection tube in back of and between the first and second beam projection tubes, the third beam projection tube being inclined relative to the first and second beam projection tubes at predetermined inclination angles;

transmitting beams projected by the first and second beam projection tubes and reflecting a beam projected by the third beam projection tube; and reflecting the transmitted and reflected beams onto the screen.

18. A method according to claim 17, wherein said transmitting and reflecting steps include the step of using a dichroic mirror placed on an optical axis of the third beam projection tube in front of the third beam projection tube and using a reflection mirror.

* * * * *